(12) United States Patent
Zero

(10) Patent No.: US 12,090,449 B2
(45) Date of Patent: Sep. 17, 2024

(54) HIGH FLOW LIQUID FILTRATION DEVICE INCLUDING A POROUS POLYPARAXYLYLENE MEMBRANE OR A POROUS POLYPARAXYLYLENE/POLYTETRA-FLUOROETHYLENE COMPOSITE MEMBRANE

(71) Applicant: W.L. Gore & Associates, Inc., Newark, DE (US)

(72) Inventor: Scott J. Zero, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 827 days.

(21) Appl. No.: 17/257,633

(22) PCT Filed: Jul. 19, 2019

(86) PCT No.: PCT/US2019/042638
§ 371 (c)(1),
(2) Date: Jan. 4, 2021

(87) PCT Pub. No.: WO2020/018925
PCT Pub. Date: Jan. 23, 2020

(65) Prior Publication Data
US 2021/0275976 A1 Sep. 9, 2021

Related U.S. Application Data

(60) Provisional application No. 62/700,546, filed on Jul. 19, 2018.

(51) Int. Cl.
*B01D 71/44* (2006.01)
*B01D 61/14* (2006.01)
(Continued)

(52) U.S. Cl.
CPC .......... *B01D 71/06* (2013.01); *B01D 61/145* (2013.01); *B01D 61/147* (2013.01); *B01D 61/18* (2013.01);
(Continued)

(58) Field of Classification Search
CPC .... B01D 71/44; B01D 61/145; B01D 61/147; B01D 61/18; B01D 69/02; B01D 69/12;
(Continued)

(56) References Cited

U.S. PATENT DOCUMENTS 4,576,869 A 3/1986 Malhotra et al.
6,541,589 B1 4/2003 Baillie
(Continued)

FOREIGN PATENT DOCUMENTS

CA 3005270 8/2017
CN 106110762 11/2016
(Continued)

*Primary Examiner* — Madeline Gonzalez

(57) ABSTRACT

A filtration device containing a porous polyparaxylylene (PPX) filtration article is provided. The PPX filtration article includes at least one PPX polymer membrane layer and one or more substrate. Optionally, the PPX filtration article may include one or more support layer(s). The PPX polymer membrane has a pore size from about 1 nm to about 100 nm. The filtration article has a PVA_20 less than about 0.6 $cm^3/m^2$ and/or a mass/area (MPA) less than about 30 $g/m^2$. The PPX filtration article separates and retains nanoparticles from a feed fluid with high permeability. In use, the PPX filtration article filters nanoparticles from a feed flow by passing the feed fluid through at least one PPX polymer membrane within the filtration article where the nanoparticles are separated and removed from the feed fluid. The PPX polymer membranes may be resistant to chemical attack, gamma radiation, and are thermally stable, biocompatible, and strong.

11 Claims, 11 Drawing Sheets

(51) Int. Cl.
*B01D 61/18* (2006.01)
*B01D 69/02* (2006.01)
*B01D 69/12* (2006.01)
*B01D 71/06* (2006.01)
*B01D 71/36* (2006.01)
*C02F 1/44* (2023.01)

(52) U.S. Cl.
CPC ......... *B01D 69/02* (2013.01); *B01D 69/1216* (2022.08); *B01D 71/36* (2013.01); *C02F 1/444* (2013.01); *B01D 2325/0283* (2022.08); *B01D 2325/04* (2013.01); *B01D 2325/20* (2013.01)

(58) Field of Classification Search
CPC .......................... B01D 71/36; B01D 2325/02; B01D 2325/04; B01D 2325/20; B01D 61/14; B01D 67/0037; B01D 71/72; C02F 1/444
USPC ..... 210/650, 490, 500.36, 500.21, 455, 439, 210/435, 441, 321.75, 321.84, 321.64
See application file for complete search history.

(56) References Cited

U.S. PATENT DOCUMENTS

| | | |
|---|---|---|
| 8,114,289 B2 | 2/2012 | Zheng et al. |
| 2013/0143326 A1 | 6/2013 | Tai et al. |
| 2014/0008210 A1 | 1/2014 | Guia et al. |
| 2016/0016124 A1* | 1/2016 | Zheng ................... B01D 63/14 |
| | | 210/500.36 |
| 2016/0032069 A1 | 2/2016 | Sbriglia et al. |
| 2016/0136914 A1 | 5/2016 | Sbriglia et al. |

FOREIGN PATENT DOCUMENTS

| | | | |
|---|---|---|---|
| JP | 2008538509 | 10/2008 | |
| JP | 2011510656 | 4/2011 | |
| JP | 6857349 | 8/2018 | |
| WO | WO-2017/132077 | 8/2017 | |
| WO | WO-2017132077 A1 * | 8/2017 | ......... B01D 67/0027 |
| WO | WO-2016/132859 | 8/2018 | |

* cited by examiner

HIGH FLOW LIQUID FILTRATION DEVICE INCLUDING A POROUS POLYPARAXYLYLENE MEMBRANE OR A POROUS POLYPARAXYLYLENE/POLYTETRA FLUOROETHYLENE COMPOSITE MEMBRANE

FIELD

The present invention relates generally to polyparaxylylene, and more specifically to liquid filtration devices that contains at least one porous polyparaxylylene (PPX) filtration article having therein at least one PPX polymer membrane layer. Methods for manufacturing the porous PPX filtration article and using the PPX filtration device are also provided.

BACKGROUND

Porous polytetrafluoroethylene (PTFE) has been used as filter media for separating relatively large nanoparticles (e.g., from about 20 nanometers (nm) to about 100 nm) from liquid media, for example, for preparing ultrapure water for use in the semiconductor and pharmaceutical industries. The porous PTFE may be in an expanded form, often referred to as expanded polytetrafluoroethylene (ePTFE), which has a node and fibril microstructure that provides a highly porous network that may be made with a very small average pore size for relatively large nanoparticle filtration.

However, there is a limit to the filtration performance of ePTFE membranes for the retention of relatively small nanoparticles (e.g., from about 5 nm to less than about 25 nm). More specifically, there are limits to the retention and flux that can be achieved with ePTFE membranes.

Thus, there exists a need in the art for a filtration membrane that is capable of separating and retaining particles of various types and sizes, such as nanoparticles (e.g., from about 5 nm to about 100 nm), including relatively large nanoparticles and relatively small nanoparticles, from a liquid media, ideally when the liquid media is traveling at a high flow rate. Non-limiting examples of suitable particles include proteins, macromolecules, viruses, colloidal particles, micelles, vesicles, and endotoxins/pyrogens. The filtration membrane should also be resistant to chemical attack, resistant to gamma radiation, thermally stable, biocompatible, and strong.

SUMMARY

According to one example, ("Example 1") a method for filtering a feed fluid includes passing a feed fluid having a population of particles through at least one PPX polymer membrane such that at least a portion of the population of particles is separated from the feed fluid.

According to another example, ("Example 2") further to Example 1, the at least one PPX polymer membrane has a thickness of about 50 microns or less.

According to another example, ("Example 3") further to Example 2, the at least one PPX polymer membrane has a thickness from about 0.05 microns to about 3 microns.

According to another example, ("Example 4") further to any of the preceding Examples, the at least one PPX polymer membrane includes PPX-N, PPX-AF4, PPX-VT4, or a combination thereof.

According to another example, ("Example 5") further to any of the preceding Examples, the at least one PPX polymer membrane is coupled to at least one side of a porous substrate.

According to another example, ("Example 6") further to Example 5, the porous substrate includes a material selected from polytetrafluoroethylene (PTFE), expanded polytetrafluorethylene (ePTFE), polyimide, polyamide-imide, ultra high molecular weight polyethylene (UHMWPE), silicon, glass, and zinc.

According to another example, ("Example 7") further to Example 5, the porous substrate has a thickness that is greater than the at least one PPX polymer membrane.

According to another example, ("Example 8") further to Example 5, the porous substrate has a porosity that is greater than a porosity of the at least one PPX polymer membrane.

According to another example, ("Example 9") further to any of the preceding Examples, the at least one PPX polymer membrane has a permeability of at least about 0.003 $g/cm^2/min/psi$.

According to another example, ("Example 10") further to any of the preceding Examples, the at least one PPX polymer membrane has a permeability from about 0.01 $g/cm^2/min/psi$ to about 0.3 $g/cm^2/min/psi$.

According to another example, ("Example 11") further to any of the preceding Examples, the feed fluid is an aqueous liquid, a non-aqueous liquid, or a mixture thereof.

According to another example, ("Example 12") further to any of the preceding Examples, the feed fluid is a biological liquid.

According to another example, ("Example 13"), a filtration device includes at least one PPX filtration article that includes a porous substrate and at least one PPX polymer membrane coupled to at least one side of the porous substrate where the at least one PPX polymer membrane has a pore size from about 1 nm to about 100 nm, and where the PPX filtration article has at least one of a PVA_20 less than about 0.6 $cm^3/m^2$ and an mass/area (MPA) less than about 30 $g/m^2$.

According to another example, ("Example 14") further to Example 13, the at least one PPX polymer membrane has a thickness from about 0.05 microns to about 3 microns.

According to another example, ("Example 15") further to Example 13, the at least one PPX polymer membrane has a permeability of at least about 0.003 $g/cm^2/min/psi$.

According to another example, ("Example 16") further to Example 13, the at least one PPX polymer membrane has a pore size from about 5 nm to about 50 nm.

According to another example, ("Example 17") further to Example 13, the PPX filtration article has a PVA_20 from about 0.1 $cm^3/m^2$ to about 2.0 $cm^3/m^2$.

According to another example, ("Example 18") further to Example 13, the PPX filtration article has a mass/area from about 5 $g/m^2$ to about 30 $g/m^2$.

According to another example, ("Example 19") further to Example 13, the PPX filtration article has a PVA_20 from about 0.1 $cm^3/m^2$ to about 2.0 $cm^3/m^2$ and a mass/area from about 5 $g/m^2$ to about 30 $g/m^2$.

According to another example, ("Example 20") further to any of Examples 13 to 19, the at least one PPX polymer membrane includes a PPX-AF4 membrane.

According to another example, ("Example 21") further to any of Examples 13 to 19, the filtration article further includes a second PPX polymer membrane coupled to an opposing side of the porous substrate.

According to another example ("Example 22"), a filtration device includes (1) a filtration housing that has a fluid inlet configured to direct a feed fluid containing a population of particles into the filtration housing and a fluid outlet configured to direct a filtrate from the filtration housing and (2) at least one porous polyparaxylylene (PPX) polymer membrane disposed within the filtration housing between the fluid inlet and the fluid outlet and which is configured to separate at least a portion of the population of particles from the feed fluid.

According to another example, ("Example 23") further to Example 22, the at least one PPX polymer membrane includes (1) a first PPX polymer membrane coupled to a first side of a porous substrate where the first PPX polymer membrane is in fluid communication with the fluid inlet and (2) a second PPX polymer membrane coupled to a second side of the porous substrate where the second PPX polymer membrane is in fluid communication with the fluid outlet.

According to another example, ("Example 24") further to any of Examples 22 and 23, the at least one PPX polymer membrane has a permeability of at least about 0.003 g/cm$^2$/min/psi.

According to another example, ("Example 25") further to any of Examples 22, 23, and 24, the at least one PPX polymer membrane has a permeability from about 0.01 g/cm$^2$/min/psi to about 0.3 g/cm$^2$/min/psi.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

GLOSSARY

Figure 1:
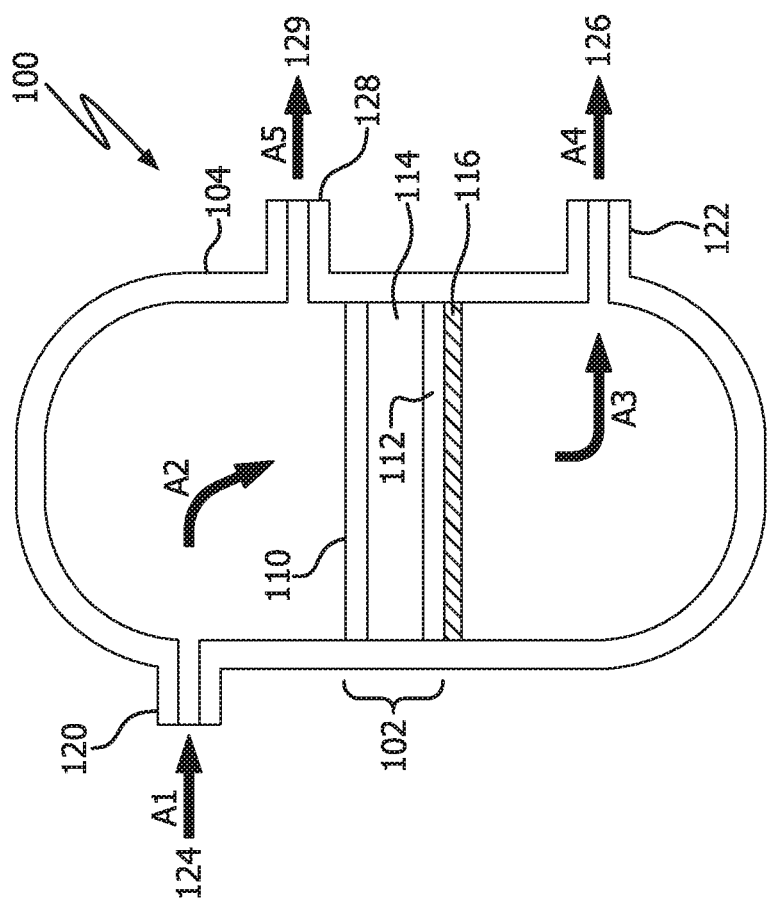
FIG. 1 is a schematic illustration of a filtration device with a porous polyparaxylylene filtration article in accordance with some embodiments.

The term "PPX" refers to polyparaxylylene or Parylene.

The term "PPX polymer" is meant to include all forms of PPX, including, but not limited to those set forth in Table 1 below and combinations thereof.

TABLE 1

PPX Polymer Forms

| Form | Structure |
|---|---|
| PPX-N | 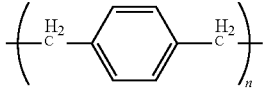 |
| PPX-AF4 (Parylene HT) | 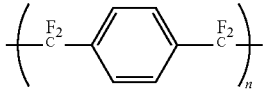 |
| PPX-VT4 |  |
| PPX-C | 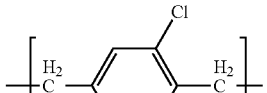 |
| PPX-D | 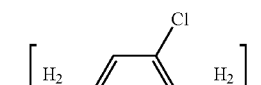 |

The term "PPX polymer film" as used herein is meant to denote unexpanded PPX polymer, either in a freestanding configuration without an underlying substrate or in a composite configuration on one or more sides of a substrate (e.g., PPX polymer film/substrate, PPX polymer film/substrate/PPX polymer film).

The term "PPX polymer membrane" as used herein is meant to denote a PPX polymer film that has been expanded in one or more directions.

The term "uniaxial expansion ratio" is meant to define strain as the final length of an expanded component (e.g., a PPX polymer membrane) divided by the original length of an unexpanded component (e.g., a PPX polymer film) along an axis.

The term "area expansion ratio" is meant to define strain as the final area of an expanded component (e.g., a PPX polymer membrane) divided by the original area of an unexpanded component (e.g., a PPX polymer film), or the product of one or more uniaxial expansion ratios.

The term "fibril axis" is meant to describe the direction parallel to the long dimension of the fibril.

The term "substantial deformation" is meant to describe a substrate that is capable of elongating in one or more direction without breaking.

DETAILED DESCRIPTION

Persons skilled in the art will readily appreciate that various aspects of the present disclosure can be realized by any number of methods and apparatuses configured to perform the intended functions. It should also be noted that the accompanying figures referred to herein are not necessarily drawn to scale, but may be exaggerated to illustrate various aspects of the present disclosure, and in that regard, the drawing figures should not be construed as limiting.

It is to be appreciated that the porous polyparaxylylene (PPX) polymer membranes described herein may also be termed as a PPX polymer membrane layer, and that these terms are interchangeable herein. Similarly, the PPX polymer film is also termed herein as a PPX polymer film layer, which are interchangeably used herein. It is also to be appreciated that the terms "PPX filtration article", "porous PPX filtration article", and "filtration article" may be interchangeably used herein. Also, the terms "support", "support layer", and "porous support layer" may be interchangeably used herein.

The present invention relates to porous PPX filtration articles (also referred to herein as PPX filtration articles or filtration articles) that contain at least one polyparaxylylene (PPX) membrane that has a node and fibril microstructure. In at least one embodiment, the fibrils contain PPX polymer chains oriented with the fibril axis. Optionally, the PPX polymer forming the PPX membrane may contain one or more comonomer. As used herein, the term "PPX polymer" is meant to include all forms of PPX, including PPX-N, PPX-AF4, PPX-VT4, and combinations thereof. It is to be understood that the filtration devices described herein are fluid filtration devices where the fluid may be aqueous, non-aqueous, or a mixture thereof.

Referring initially to FIG. 1, an embodiment of a filtration device 100 is shown with a PPX filtration article 102 disposed within an internal volume of a filtration housing 104. The PPX filtration article 102 includes at least one porous polyparaxylylene (PPX) polymer membrane. In some embodiments, the filtration article 102 has a composite configuration and includes a PPX polymer membrane layer 110, a PPX polymer membrane layer 112 (which may be the same as or different from PPX polymer membrane layer 110), and a porous substrate 114 positioned therebetween. The PPX filtration article 102 may be disc-shaped, however, the size and shape of the filtration article 102 may vary to fit within the desired filtration housing 104 and/or to accommodate the intended filtration application. For example, the filtration article 102 may have a cylindrical shape, a pleated cartridge shape, a spiral-wound shape, or another suitable shape.

The filtration housing 104 has at least one fluid inlet port 120 in fluid communication with the PPX polymer membrane layer 110 and at least one fluid outlet port 122 in fluid communication with the PPX polymer membrane layer 112. In general, fluid inlet port 120 and fluid outlet port 122 are in fluid communication with the upstream and downstream surfaces of the PPX filtration article, which may be PPX polymer membrane(s) or support layer(s). The filtration housing 104 also includes one or more support structures, such as an annular shelf (not shown), configured to support the filtration article 102 in the filtration housing 104 between the fluid inlet port 120 and the fluid outlet port 122.

During operation of the filtration device 100, a feed fluid 124 containing a population of particles (not shown) is fed into the filtration housing 104 through the fluid inlet port 120 in the direction designated by arrow A1. The feed fluid 124 may be aqueous, non-aqueous, or a mixture thereof. The feed fluid 124 may be used in the pharmaceutical, microelectronics, chemical, or food industries. In certain embodiments, the feed fluid 124 may be a concentrated or diluted biological fluid. The particles in the feed fluid 124 may be proteins, macromolecules, viruses, colloidal particles, micelles, vesicles, endotoxins/pyrogens, and combinations thereof. The feed fluid 124 travels through the housing 104 toward the PPX filtration article 102 in the direction designated by arrow A2. The filtration article 102 separates the particles from the feed fluid 124, and a filtrate 126 travels through the housing 104 in the direction designated by arrow A3. The filtrate 126 is removed from the filtration housing 104 through the fluid outlet port 122 in the direction designated by arrow A4. In certain embodiments, the filtration device 100 includes a second fluid outlet port 128 that removes a retentate 129 (i.e., a portion of the feed stream that has not passed through the PPX polymer membrane layer(s) 110, 112 and may be enriched in the particles rejected by the PPX polymer membrane(s) 110, 112) or in the direction designated by arrow A5, as shown in FIG. 1. In other embodiments, the filtration device 100 lacks the second fluid outlet port 128, and the retained particles remain on or in the PPX filtration article 102.

Each PPX polymer membrane layer 110, 112 of the PPX filtration article 102 has a node and fibril microstructure. In at least one embodiment, the fibrils in one or both of the PPX polymer membrane layers 110, 112 contain PPX polymer chains oriented along the fibril axis.

As shown, the PPX filtration article 102 of FIG. 1 has two PPX polymer membrane layers 110, 112 on opposing sides of the substrate 114, but it is also within the scope of the present disclosure for the filtration article 102 to include a single PPX polymer membrane layer (e.g., PPX polymer membrane layer 110 or PPX polymer membrane layer 112) on one side of the substrate 114. It is also within the scope of the present disclosure for the PPX filtration article 102 to include more than two PPX polymer membrane layers.

The porous substrate 114 of the filtration article 102 is not particularly limiting so long as the substrate 114 is dimensionally stable. The substrate 114 should be porous so that the feed fluid 124 is able to pass through the pores of the substrate 114. Non-limiting examples of suitable porous substrates 114 include polytetrafluoroethylene (PTFE), expanded polytetrafluorethylene (ePTFE) (e.g., a conformable ePTFE tape that has been uniaxially expanded or an ePTFE membrane that has been biaxially expanded), polyimide, polyamide-imide, silicon, glass, zinc, ultra high molecular weight polyethylene, or any material that can withstand the expansion temperature. In some embodiments, the substrate 114 is capable of substantial deformation in one or more directions, and may be formed of an unexpanded PTFE film or a partially expanded ePTFE tape or membrane. The PPX filtration article 102 of FIG. 1 has a single substrate 114, but it is also within the scope of the present disclosure for filtration article 102 to include multiple substrates. Still looking at FIG. 1, the PPX filtration article 102 may include one or more optional porous support layers 116. The support layer 116 may be the same as or different from the substrate 114 and from each other. Non-limiting examples of suitable support layers 116 include woven materials, non-woven materials, scrims, and meshes.

Various properties of each PPX polymer membrane layer 110, 112 and/or the substrate 114 of the filtration article 102 may be optimized to achieve a desired filtration performance with a desired permeability for the particular particles being separated from the feed fluid 124. Properties that may be optimized include, for example, thickness, pore size, and percent porosity of the PPX polymer membrane layers 110, 112 and/or the substrate 114, as discussed in the following paragraphs. Other properties that may be optimized in the PPX polymer membrane layer 110, 112 include, for example, node and/or fibril geometry or size and density. On the other hand, properties of the PPX filtration article 102 that may be optimized include, for example, the quality factor, mass/area (MPA) and PVA_20 as discussed below.

As discussed above, the thicknesses of the PPX polymer membrane layers 110, 112 and the substrate 114 may be optimized. Each PPX polymer membrane layer 110, 112 of the filtration article 102 may have a nominal thickness less than about 50 microns, less than about 40 microns, less than about 30 microns, less than about 20 microns, less than about 10 microns, less than about 5 microns, less than about 3 microns, less than about 2 microns, or less than about 1 micron. In some embodiments, each PPX polymer membrane layer 110, 112 has a thickness from about 0.05 micron to about 50 microns, from about 0.05 micron to about 40 microns, from about 0.05 micron to about 30 microns, from about 0.05 micron to about 20 microns, from about 0.05 micron to about 10 microns, from about 0.05 micron to about 5 microns, from about 0.05 micron to about 3 microns, from about 0.05 micron to about 2 microns, or from about 0.05 micron to about 1 micron. By comparison, the substrate 114 of the PPX filtration article 102 may be relatively thick (e.g., thicker than about 50 microns).

In addition, the porosities of the PPX polymer membrane layers 110, 112 and the substrate 114 may be optimized. Each PPX polymer membrane layer 110, 112 of the PPX filtration article 102 may have relatively small pores with an average pore size of less than about 100 nanometers (nm), less than about 60 nanometers (nm), less than about 40 nm, less than about 20 nm, or less than about 10 nm. In some embodiments, each PPX polymer membrane layer 110, 112 may have pores with an average pore size from about 1 nm to about 100 nm, about 1 nm to about 60 nm, from about 1 nm to about 40 nm, from about 1 nm to about 20 nm, from about 1 nm to about 10 nm, from about 5 nm to 100 nm, from about 5 nm to 60 nm or about 5 nm to 50 nm. Also, each PPX polymer membrane layer 110, 112 may have a percent porosity of at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or up to (and including) about 95%. In other embodiments, each PPX polymer membrane layer 110, 112 may have a percent porosity from about 5% to about 95%, from about 5% to about 75%, from about 10% to about 50%, or from about 10% to about 25%. By comparison, the substrate 114 of PPX filtration article 102 may be more porous than PPX polymer membrane layers 110, 112.

The PPX polymer membrane layers described herein may have one or more different microstructures. In at least one embodiment, the PPX polymer membrane layers 110, 112 share the same microstructure or substantially the same microstructure such that the microstructures cannot be distinguished from each other. In another embodiment, the PPX polymer membrane layer 110 has a first microstructure and the PPX polymer layer 112 has a second microstructure that is different from the first microstructure. The difference between the various microstructures of the PPX polymer membrane layers 110, 112 can be measured by, for example, a difference in porosity, a difference in node and/or fibril geometry or size, and/or a difference in density.

Referring still to FIG. 1, the small pores in the PPX polymer membrane layers 110, 112 may allow the PPX filtration article 102 to separate and retain particles of various types and sizes, such as nanoparticles (e.g., from about 5 nm to about 100 nm), including relatively large nanoparticles (e.g., from about 20 nm to about 100 nm) and relatively small nanoparticles (e.g., from about 5 nm to less than about 20 nm) from the feed fluid 124. In certain embodiments, such as when separating relatively large nanoparticles from the feed fluid 124, the filtration article 102 may achieve nanoparticle retention of about 40% or more, about 60% or more, about 80% or more, or about 90% or more with each pass. In other embodiments, such as when separating relatively small nanoparticles from the feed fluid 124, the PPX filtration article 102 may achieve nanoparticle retention of about 40% or less, about 30% or less, about 20% or less, or about 10% or less with each pass. The filtration article 102 may achieve different degrees of filtration depending on the size of the pores in the PPX polymer membrane layers 110, 112. For example, the PPX filtration article 102 may achieve micro-filtration (MF) with average pore sizes of about 100 nm (0.1 microns) or less or ultra-filtration (UF) with average pore sizes of about 10 nm (0.01 microns) or less.

In addition, the thin construction of the PPX polymer membrane layers 110, 112 and/or the comparatively large pores in the substrate 114 create a highly permeable (i.e., low resistance to flow) PPX filtration article 102 that accommodates high flow rates of the feed fluid 124 at a given pressure. For example, the filtration article 102 may have a permeability of at least about 0.003 $g/cm^2/min/psi$, at least about 0.01 $g/cm^2/min/psi$, at least about 0.05 $g/cm^2/min/psi$, at least about 0.1 $g/cm^2/min/psi$, at least about 0.3 $g/cm^2/min/psi$, and at least about 0.5 $g/cm^2/min/psi$. In some embodiments, the filtration article 102 may have a permeability from about 0.01 $g/cm^2/min/psi$ to about 0.5 $g/cm^2/min/psi$, from about 0.01 $g/cm^2/min/psi$ to about 0.3 $g/cm^2/min/psi$, or from about 0.05 $g/cm^2/min/psi$ to about 0.1 $g/cm^2/min/psi$. The permeability of the PPX filtration article 102 may vary depending on the filtration application. For example, the permeability of the PPX filtration article 102 may decrease if separating relatively small nanoparticles from the feed fluid 124 and may increase if separating relatively large nanoparticles from the feed fluid 124. The filtration article 102 may also be resistant to chemical attack, resistant to gamma radiation, thermally stable, biocompatible, strong, and combinations thereof.

Figure 2A:
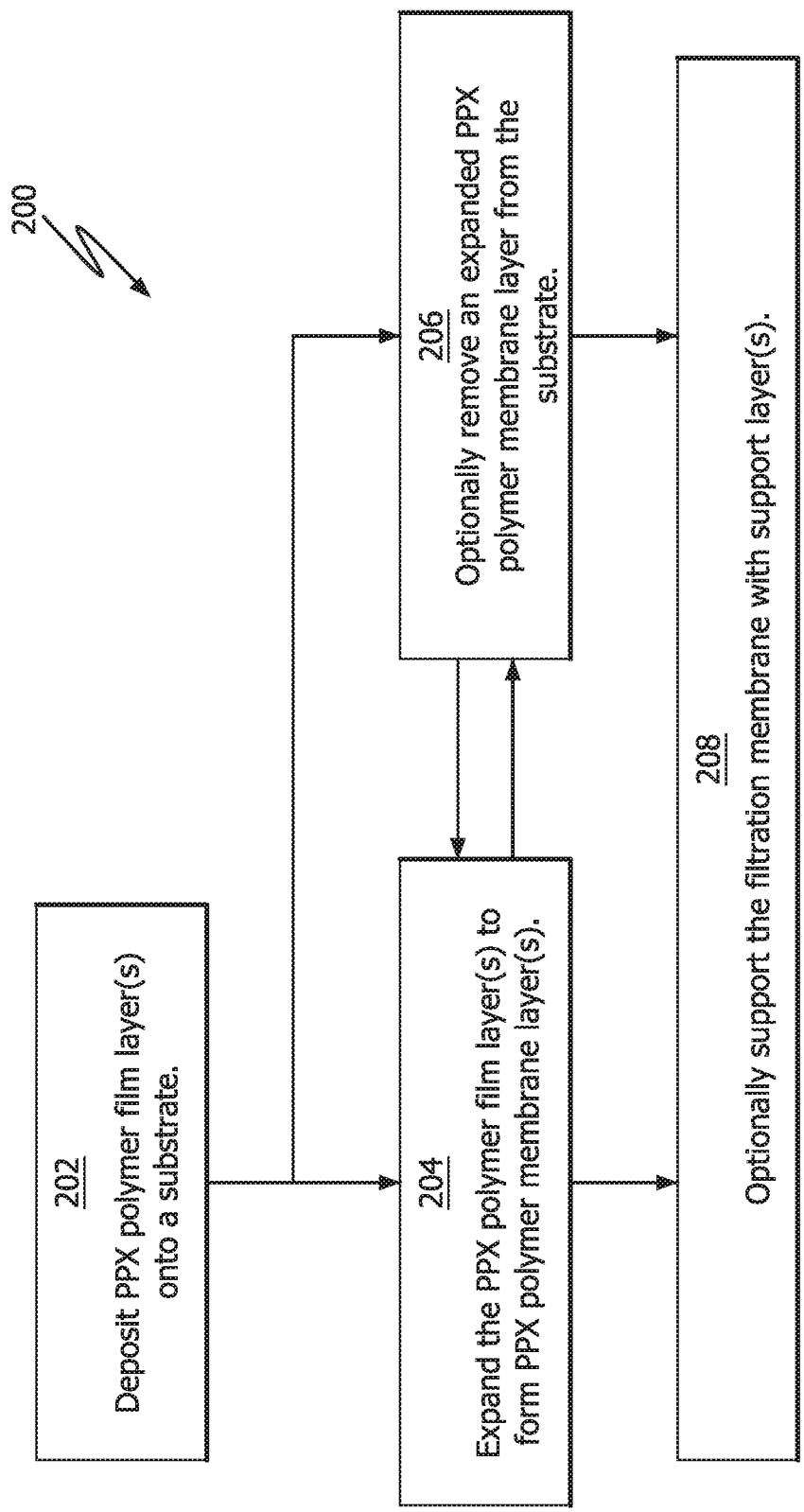
FIG. 2A is a flow chart of a first embodiment of a method for constructing the porous polyparaxylylene (PPX) filtration article in accordance with some embodiments.
Figure 2B:
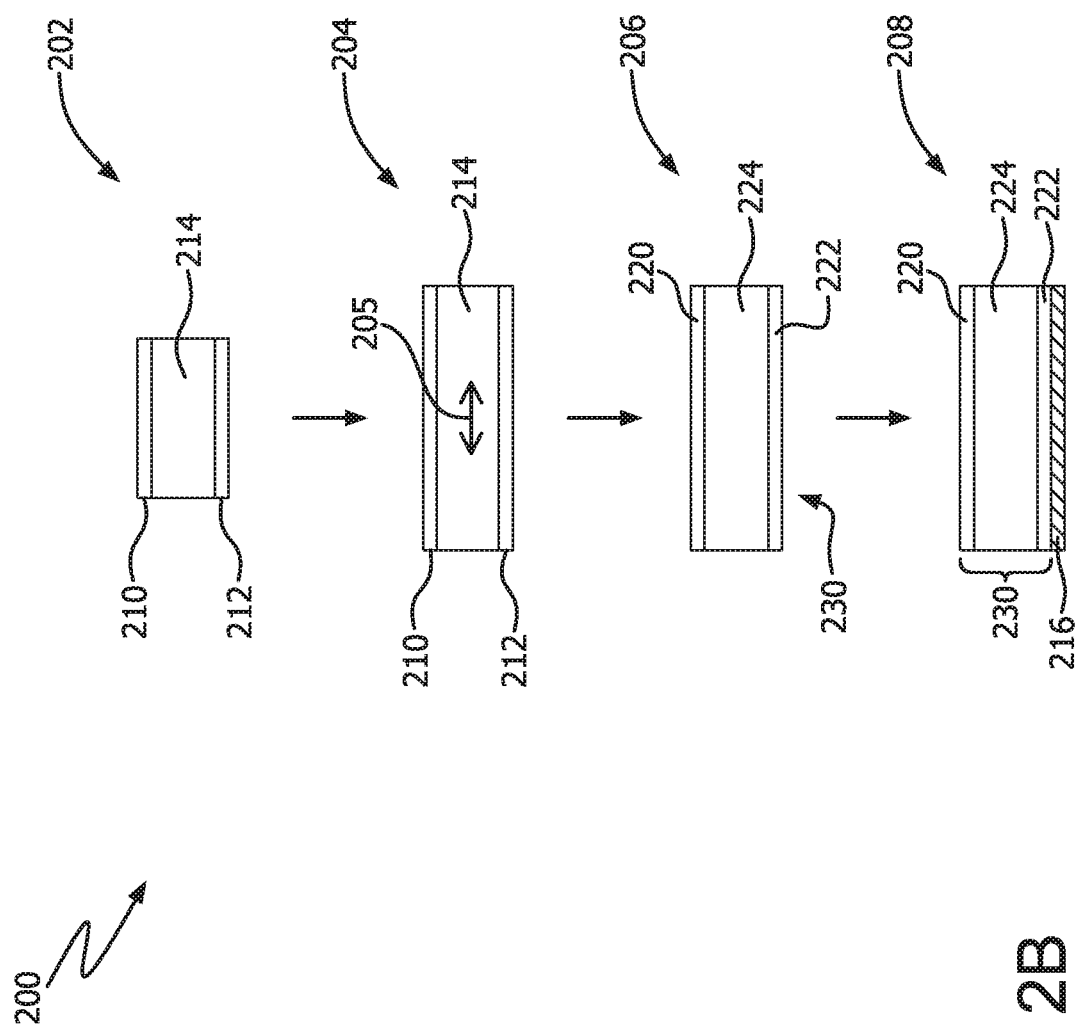
FIG. 2B is a schematic illustration of an application of the method depicted in FIG. 2 in accordance with some embodiments.

Referring now to FIGS. 2A and 2B, an exemplary method 200 of constructing a filtration article is shown. In the embodiment depicted in FIGS. 2A and 2B, PPX polymer film layers 210, 212 are deposited onto an unexpanded or partially expanded substrate 214 in step 202. The substrate 214 is not particularly limiting so long as the substrate 214 is expandable, dimensionally stable and the PPX polymer films formed thereon can be removed therefrom if desired. One non-limiting example of a suitable substrate is an expanded (or partially expanded) polytetrafluoroethylene (ePTFE) substrate. In step 204, the PPX polymer films 210, 212 and substrate 214 are co-expanded, such as in the direction of arrow 205, to form a porous PPX filtration article 230 which includes PPX polymer membrane layers 220, 222 and an expanded substrate 224 therebetween. In some embodiments, the PPX filtration article 230 is equivalent to the PPX filtration article 102 shown in FIG. 1.

Figure 2C:
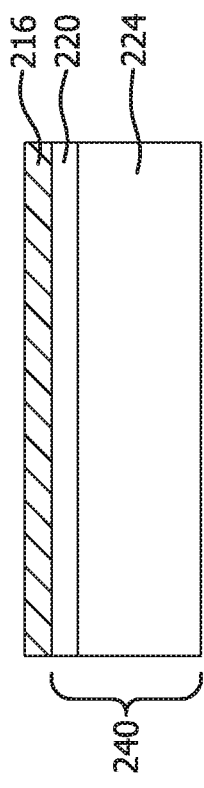
FIG. 2C is a schematic illustration of a porous PPX filtration article having one PPX polymer membrane in accordance with the method of FIG. 2 in accordance with some embodiments.

Optionally, a PPX polymer membrane layer may be removed from the expanded PPX filtration article 230, resulting in an expanded substrate 224 having thereon one of the PPX membrane layers 220, 222. As shown in FIG. 2C, porous PPX filtration article 240 has an expanded substrate 224 and PPX polymer membrane layer 220. Article 250, depicted in FIG. 2D, has an expanded substrate 224 and PPX polymer membrane layer 222. Each PPX filtration article 240, 250 may be used as a porous PPX filtration article 102 in the filtration device 100 shown in FIG. 1.

The depositing step 202 of method 200 may involve sequentially or simultaneously depositing PPX polymer film layers 210, 212 onto one or both sides of the substrate 214, such as by a conventional vapor deposition method. During the depositing step 202, the substrate 214 may have a relatively low percent porosity of less than about 40%, less than about 30%, less than about 20%, or less than about 10%, such that PPX polymer film layers 210, 212 are deposited predominantly on the outer surface of the substrate 214 rather than infiltrating or entering into the pores of the substrate 214. Thus, although the substrate 214 may be partially expanded before the depositing step 202, a majority (or all) of the expansion of both the substrate 214 and the PPX polymer films 210, 212 occur during the expanding step 204.

As shown in FIGS. 2A and 2B, the expanding step 204 may involve stretching the PPX polymer film layers 210, 212 and the substrate 214 from step 202 together in one or more directions to convert the PPX polymer film layers 210, 212 into porous, expanded PPX polymer membrane layers 220, 222 while co-expanding the substrate 114 into an expanded substrate 224. If the substrate 214 was partially expanded before the depositing step 202, the substrate 214 may become further expanded during the expanding step 204 and converted into an expanded substrate 224. The expansion may occur at temperatures from about 80° C. to about 220° C. (e.g., about 130° C.), from about 100° C. to about 220° C., from about 220° C. to about 340° C., or from about 290° C. to about 340° C. In some embodiments, the expansion may occur above the melt temperature of the substrate. Additionally, the expanding step 204 may be conducted at engineering strain rates (ESR) up to 10,000%/second, from 1%/second to 10,000%/second, or from 10%/second to 5000%/second, including all ranges therebetween.

Figure 2D:
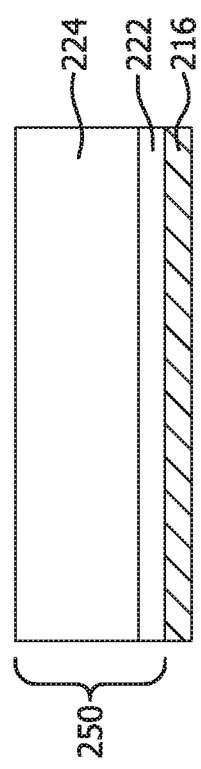
FIG. 2D is a schematic illustration of another porous PPX filtration article containing one PPX polymer membrane in accordance with some embodiments.

Optionally, one of the PPX polymer membranes layers 220, 222 may be removed the substrate 224 of the porous PPX filtration article 230. In some embodiments, the substrate 214 is at least partially melted without melting the corresponding PPX polymer membrane layers 220, 222. One of the PPX polymer membrane layers 220, 222 is then separated from the softened or melted substrate 214 to produce a porous article having a single PPX polymer membrane layer and a substrate 224 as shown in FIGS. 2C and 2D. In another embodiment, a PPX polymer membrane layer 220 or 222 may be removed from the substrate 224, such as by pulling the PPX polymer membrane layer 220 or 222 away from the substrate 224, such as, for example, by using an adhesive material (e.g., an adhesive tape) or by chemically degrading or otherwise abrading the PPX polymer membrane. The resulting porous PPX filtration articles 240, 250 containing one PPX polymer membrane layer 210 or 212 and substrate 214 are depicted in FIGS. 2C and 2D, respectively. In yet another embodiment, the PPX filtration articles 240, 250 may be formed by removing a PPX polymer film layer 210 or 212 from the substrate 214 in step 202 prior to the expanding step 204. In particular, a PPX polymer film layer 210 or 212 may be removed as described above and discarded. The remaining PPX polymer film layer 210 or 212 and the substrate 214 are then co-expanded as taught in step 204 to form PPX filtration articles 240, 250.

Figure 3:
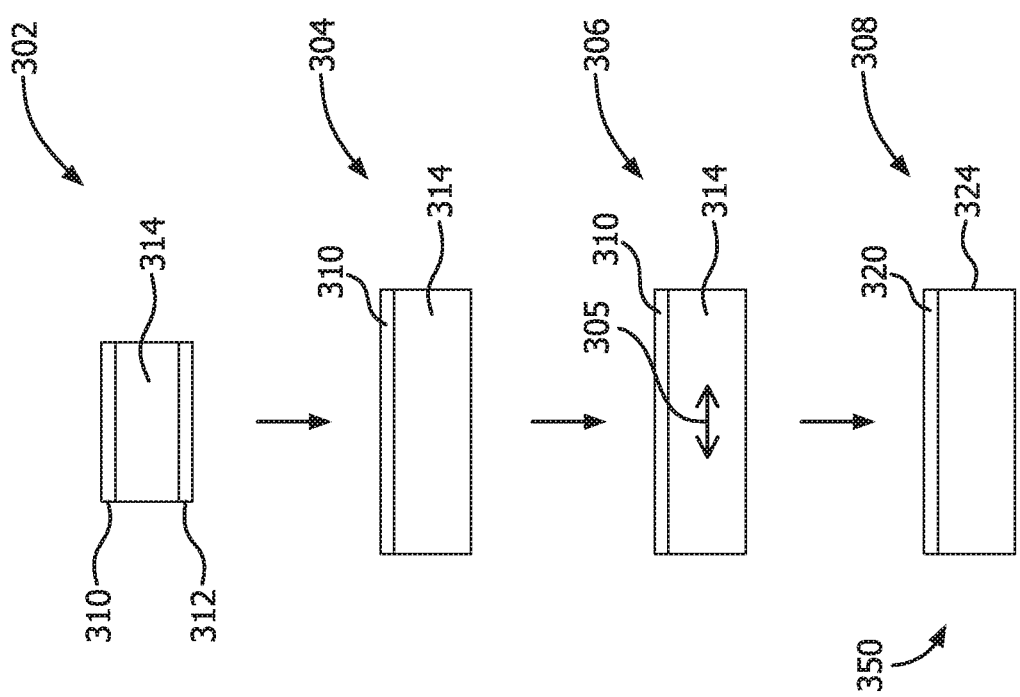
FIG. 3 is a schematic illustration of another method for constructing a porous PPX filtration article.

In some embodiments, a support layer 216 may be positioned on the PPX polymer film(s) of the filtration articles 230, 240, and 250, on the substrate 224, or both on the PPX polymerfilm(s) and the substrate. Method 200 of FIGS. 2A and 2B illustrate an optional supporting step 208. The supporting step 208 may involve layering, bonding, laminating, or otherwise adhering one or more support layers to the PPX filtration article 240, 250, as shown in FIGS. 2B, 2C, and 2D. Other support layers may be seen in FIGS. 1, 7, and 8, Turning to FIG. 3, a second method of forming a PPX filtration article having a single PPX polymer membrane layer is depicted. In step 302, PPX polymer film layers 310, 312 are deposited onto an unexpanded or partially expanded substrate 314, Next, one of the PPX polymer film layers 310, 312 is removed. As shown in step 304, in this embodiment, the PPX polymer film layer 312 is removed and discarded, leaving the PPX polymer film layer 310 and substrate 314. It is to be appreciated that PPX polymer film layer 310 may be removed and discarded, leaving PPX polymer film layer 312 (not depicted), and is considered to be in the purview of the invention. Alternatively, PPX polymer film layer 310 may be removed and discarded, leaving PPX polymer film layer 312 (not depicted) on the substrate 314, and such an embodiment is also considered within the purview of the invention. In step 306, the PPX polymer film layer 310 and substrate 314 are co-expanded, such as in the direction depicted by arrow 305. The expansion step 306 results in a PPX filtration article 350 having a PPX polymer membrane layer 320 and expanded substrate 324. As described above, PPX filtration article 350 may be used as a PPX filtration article 102, with or without the addition on a support layer (not depicted).

Figure 6:
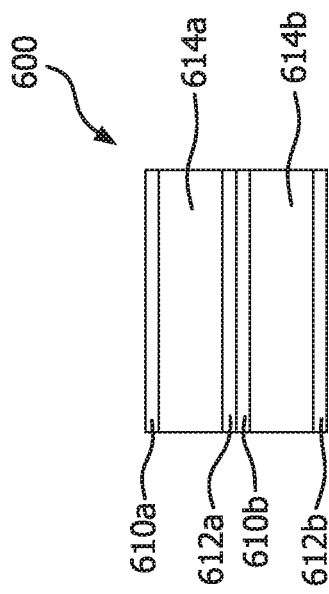
FIG. 6 is a schematic illustration of another porous PPX filtration membrane in accordance with some embodiments.
Figure 7:
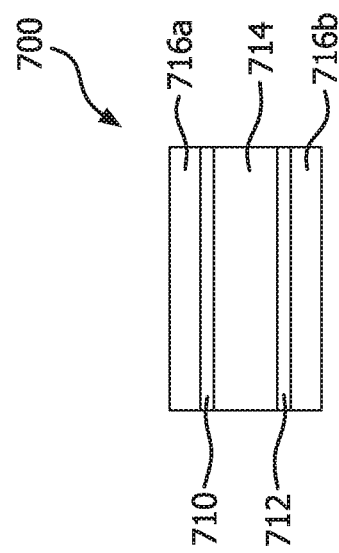
FIG. 7 is a schematic illustration of yet another porous PPX filtration membrane in accordance with some embodiments.

It is to be appreciated that any number of substrates and/or support layers may be positioned between or on the PPX polymer membrane layers, and such embodiments are considered to be within the purview of the disclosure. For example, the filtration membrane 600 shown in FIG. 6 includes four PPX polymer membrane layers 610a, 610b, 612a, 612b. The filtration membrane 600 shown in FIG. 6 includes two substrates 614a, 614b, where the substrate 614a is sandwiched between respective PPX polymer membrane layers 610a, 612a and the substrate 614b is sandwiched between respective PPX polymer membrane layers 610b, 612b. In some embodiments, the adjacent PPX polymer membrane layers 610b, 612a may be bonded together. Another embodiment is shown in FIG. 7, which shows a filtration membrane 700 having two support layers 716a, 716b, where the support layer 716a is bonded to the upper PPX polymer membrane layer 710 and the support layer 716b is bonded to the lower PPX polymer membrane layer 712.

Figure 8:
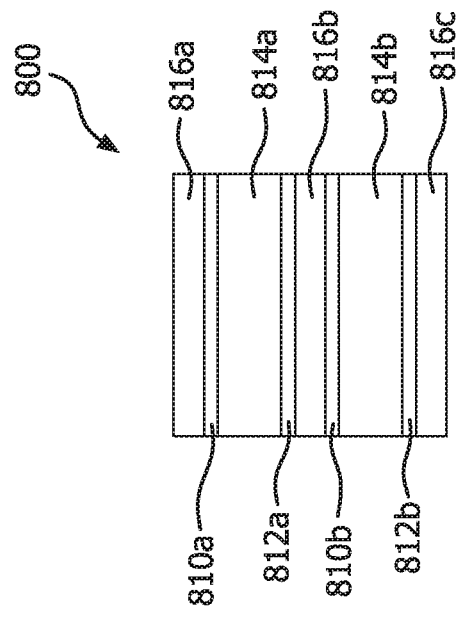
FIG. 8 is a schematic illustration of still yet another porous PPX filtration membrane in accordance with some embodiments.

As another non-limiting example, the filtration membrane 800 shown in FIG. 8 includes three support layers 816a, 816b, 816c, where the support layer 816a is bonded to the upper PPX polymer membrane layer 810a, the support layer 816b is bonded to the inner PPX polymer membrane layers 812a, 810b, and the support layer 816c is bonded to the lower PPX polymer membrane layer 812b. It is to be appreciated that the substrates described herein may be the same or different from each other and that the PPX polymer membrane layers described herein may be the same and/or different from each other. It is also to be appreciated that any number of support layers and/or PPX polymer membrane layers may be present in the PPX filtration article. The support layer(s) may be positioned at any location within the PPX filtration article, e.g., they may be positioned adjacent to each other, they may be separated by one or more PPX polymer membrane layer, and/or they may provide the first layer or the final layer in the PPX filtration article through which the filtrate passes.

Figure 4:
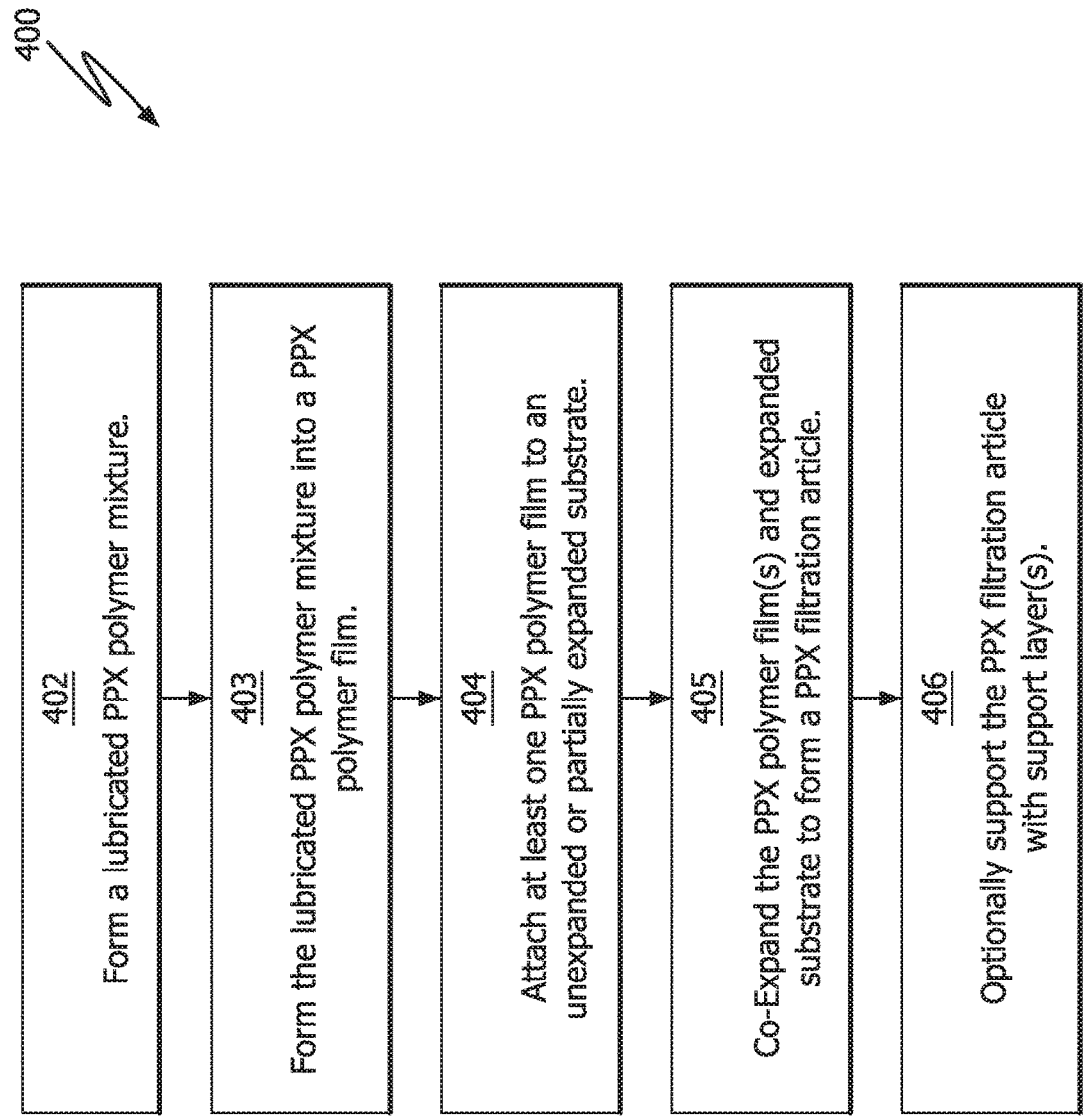
FIG. 4 is a flow chart of yet another method for constructing a porous PPX filtration article in accordance with some embodiments.

Referring next to FIG. 4, another method 400 of constructing a PPX filtration article is depicted. Method 400 involves forming a lubricated PPX polymer mixture in step 402, forming the lubricated PPX polymer mixture into a PPX polymer film in step 403, attaching the PPX polymer film to an unexpanded or partially expanded substrate in step 404, expanding the PPX polymer film and substrate to form a PPX polymer article in step 405. Method 400 also includes an optional step to support the PPX polymer membrane with a support layer(s) in step 406. Each step is discussed in detail below.

The mixture formation step 402 of method 400 may involve combining a PPX polymer in the form of a powder with a processing aid, such as a lubricant. The lubricant may be an incompressible fluid that is not a solvent for the PPX polymer during method 400. The lubricant selection is not particularly limiting and may depend on flammability, evaporation rate, and economic considerations. Suitable lubricants include, for example, light mineral oil, aliphatic hydrocarbons, aromatic hydrocarbons, halogenated hydrocarbons, and combinations thereof.

Once combined, the PPX polymer and the lubricant may be mixed together to uniformly or substantially uniformly distribute the lubricant in the mixture and create a homogenous mixture. Various mixing times and mixing methods may be used. For example, for PPX-AF4, the mixture formation step 402 may be performed at a temperature of about 80° C. to about 220° C., from about 100° C. to about 290° C., or from about 220° C. to about 290° C., or from about 290° C. to about 450° C. For PPX-N and PPX-VT4, which are subject to thermal decomposition and oxidation, the mixture formation step 402 may be performed below the decomposition temperature, namely from about 220° C. to about 250° C., and/or in an inert atmosphere.

The film formation step 403 of method 400 may involve applying a sufficient amount of heat, pressure, and/or shear to form inter-particle connections and create a coherent PPX polymer film 410. Suitable forming methods include, for example, ram extrusion (i.e., paste extrusion or paste processing when lubricant is present) and calendering. The film formation step 403 may be performed at the same or similar temperatures as the mixture formation step 402. The PPX polymer film is a freestanding structure (not illustrated). Also, the PPX polymer film should be sufficiently strong for the subsequent laminating step 404 and expanding step 405. The PPX polymer film(s) obtained in the film formation step 403 is then adhered, laminated, or otherwise attached to a substrate or partially expanded substrate 414 in step 404. Once the PPX polymer film(s) is attached to the substrate, the PPX polymer film(s) and substrate are then co-expanded in step 405 in one or more directions to form a PPX filtration article (containing at least one PPX polymer membrane layer on the expanded substrate). A support layer 416 may optionally be attached to the PPX polymer membrane layer(s) in step 406.

Figure 5:
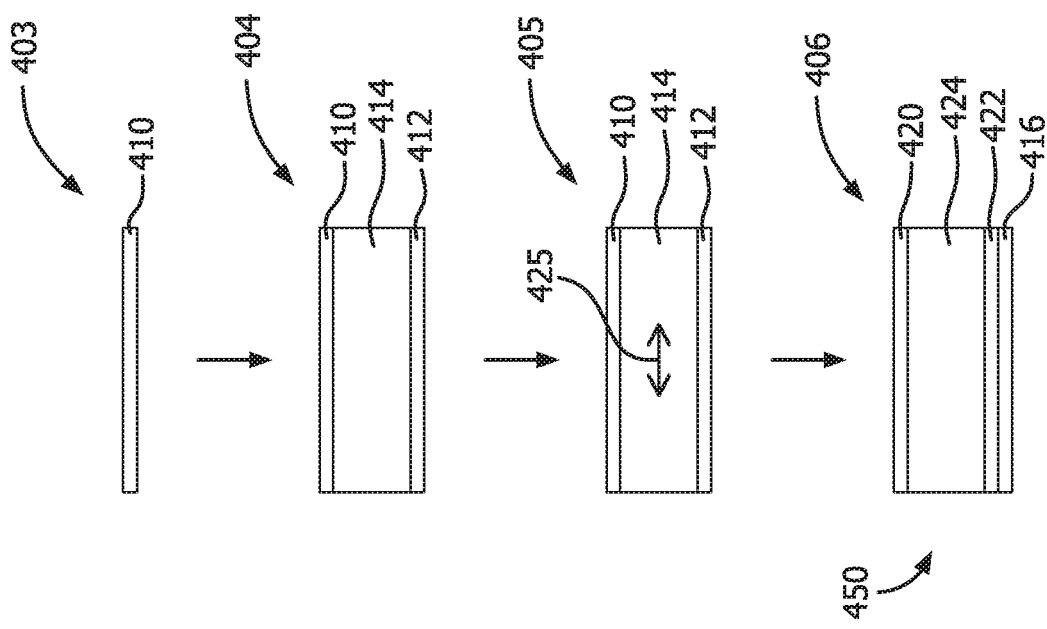
FIG. 5 is a schematic illustration of an application of the method depicted in FIG. 4 in accordance with some embodiments.

In FIG. 5, two PPX polymer films 410, 412 are attached to opposing sides of the substrate 414. The expanding step 405 of method 400 involves stretching the PPX polymer film(s) and substrate 414 in one or more directions (such as in the direction of arrow 425) to form a porous PPX filtration article 450. The expanding step 405 of method 400 may be similar or identical to the expanding step 204 of method 200. It should be noted, however, that the expanding steps 204, 405 may produce PPX polymer membrane layers 110, 112 having different microstructures.

The methods described herein may advantageously be tailored to achieve a desired PPX filtration article. For example, the substrates may be selected so as to have desired properties such as, but not limited to, thickness, pore size, and percent porosity. Additionally, the rate of expansion, the temperature of expansion, and the expansion ratio in one or more directions of the PPX polymer films and substrates may be controlled to achieve certain properties. For example, increasing the uniaxial or area expansion ratio of the expanding steps 204, 306 may increase the porosity of the PPX polymer membrane layers and the substrate and thus the permeability of the resulting PPX filtration article. In each embodiment, the PPX polymer membrane layers and/or the substrate in the PPX filtration article may be optimized to achieve a desired filtration performance with a desired permeability and performance.

Additionally, the methods described herein may also include an optional surface modification step (not shown), in which the surface energy of one or both of the PPX polymer membrane layers may be modified to accommodate the intended filtration application. For example, to enable wetting with aqueous solutions or to prevent de-wetting from aqueous solutions, the benzene ring structure in the PPX polymers (See Table 1) of one or both of the PPX polymer membrane layers may be coated or otherwise modified with ethylene vinyl alcohol, polyvinyl alcohol, an amine, or another suitable functional group. The same or different surface modification step(s) may also be applied to support layers present in the PPX filtration article or filtration device.

Test Methods

It should be understood that although certain methods and equipment are described below, other methods or equipment determined suitable by one of ordinary skill in the art may be alternatively utilized.

ATEQ Airflow

The ATEQ airflow test measures laminar volumetric flow rates of air through membrane samples. Each membrane sample was clamped between two plates in a manner that seals an area of 2.99 $cm^2$ across the flow pathway. An ATEQ® (ATEQ Corp., Livonia, MI) Premier D Compact Flow Tester was used to measure airflow rate (L/hr) through each membrane sample by challenging it with a differential air pressure of 1.2 kPa (12 mbar) through the membrane.

Gurley Airflow

The Gurley airflow test measures the time in seconds for 100 $cm^3$ of air to flow through a 1 $in^2$ (~6.45 $cm^2$) membrane sample at differential pressure of 0.177 psi (~1.22 kPa). The samples were tested in a GURLEY™ Densometer and Smoothness Tester Model 4340 (Gurley Precision Instruments, Troy, NY).

Thickness

Sample thickness was measured using a Keyence LS-7010M digital micrometer (Keyence Corporation, Mechelen, Belgium).

Mass per Area (Mass/Area)

The mass/area of the membrane was calculated by measuring the mass of a well-defined area of the membrane sample using a scale. The sample was cut to a defined area using a die or any precise cutting instrument.

Density

The density was calculated by dividing the Mass per Area by Thickness.

Determination of Permeability and Retention with Bead Tests

The bead test measures permeability and bead retention of the membrane sample. The membrane sample was restrained in a 25 mm filter holder. The membrane was first wetted with an isopropyl alcohol (IPA)-DI water solution (70:30 v/v IPA:water). Air pressure was used to force this solution through the membrane. 7 grams of solution was flowed through the sample, followed by 10 grams of aqueous solution made of 1% by volume of the non-ionic surfactant TRITON™ X-100 (CAS 9002-93-1; Sigma Aldrich, St. Louis, MO) in DI water. The membrane was then challenged with a solution of 0.025 µm diameter polystyrene latex beads (Fluoro-Max R25 red fluorescent polymer microspheres; Thermo Fisher Scientific, Waltham, MA) dispersed in an aqueous solution made of 1% by volume of TRITON™ X-100 in DI water, such that the membrane was challenged with a quantity of beads sufficient to cover the membrane surface area with a single monolayer of beads. The concentration of the beads in the challenge solution and filtrate was determined using a calibration curve established using bead solutions of known concentration, and measurements of solution fluorescence measured with an Agilent Technologies Cary Eclipse Fluorescence Spectrophotometer (Agilent Technologies, Santa Clara, CA).

The permeability of the membrane was calculated using Equation (1) below.

$$k = \frac{g}{AtP} \quad (1)$$

In Equation (1) above, k is the permeability of the membrane, g is the mass of an aliquot of filtrate, A is the physical area of the membrane sample in the filter holder, t is the time require to collect the aliquot of filtrate, and P is the pressure differential across the membrane. In Equation (1), g/t is the mass flow rate through the membrane and g/At is the mass flux through the membrane.

The percent of beads in the solution that were retained by the membrane was calculated using Equation (2) below.

$$\% \text{ Retention} = 100 \frac{C_{challenge} - C_{filtrate}}{C_{challenge}} \quad (2)$$

In Equation (2) above, $C_{challenge}$ is the concentration of beads in the challenge solution, and $C_{filtrate}$ is the concentration of beads in the filtrate.

Quality Factor

The filtration article quality factor was calculated using metrics from the bead test, using Equation (3) below:

Quality Factor=−ln(P)*Permeability (3)

where P is the filter penetration as defined by Equation (4):

P=(1−% Retention/100) (4)

Method for Determining Gas Sorption

Gas sorption was performed on an AutoSorb iQ MP-XR gas sorption instrument from Quantachrome Instruments (Boynton Beach, FL, USA) using argon at 87 K. Approximately 0.1 g of sample was degassed using a step heating profile up to 130° C. for 3 hours under high vacuum. Low initial values of $p/p_0$ were used in order to assess the pore structure of the samples down to the micropore regime (<2 nm). The quantity of gas adsorbed was converted to a volume at standard temperature and pressure (273.15 K (0° C.) and 760 torr (~101.33 kPa)) and divided by the mass of the degassed sample to yield a specific volume. The vapor pressure ($p_0$) of the argon was measured at each isotherm point and used to calculate the partial pressure (i.e. $p/p_0$) from the dosed pressure. The isotherm was then generated from the specific volumes measured at each partial pressure.

The pore size distribution of the samples were calculated from the isotherms using the VersaWin software from Quantachrome and an included calculation model (called "Argon at 87 K on carbon (slit pore, NLDFT equilibrium model)"). The output of these DFT calculations is a pore size distribution that is valid over a pore diameter range of 0.35 nm to 40 nm as well as a cumulative pore volume over the same range in units of $cm^2/g$. The value of the cumulative pore volume pore volume per unit mass for pore sizes less than 20.056 nm was multiplied by the mass per unit area of the sample to yield the volume of pores less than 20 nm per unit membrane area, denoted as PVA_20, where PVA_20 is the volume of pores smaller than 20 nm per unit membrane area ($cm^3/m^2$). PVA_20 is defined by Equation (5):

PVA_20=Cumulative Pore Volume[$cm^3/g$, 20.065 nm]*MPA[$g/m^2$] (5).

EXAMPLES

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

Comparative Example 1

A fine powder of polytetrafluoroethylene polymer made in accordance with the teachings of U.S. Pat. No. 6,541,589 to Baillie was combined with 0.184 lb/lb of an isoparaffinic hydrocarbon lubricant (ISOPAR™ K, Exxon, Houston, Texas). The resultant mixture was then blended, compressed into a cylindrical pellet, and thermally conditioned for at least 8 hours at a temperature of 49° C. The cylindrical pellet was then extruded through a rectangular orifice die at a reduction ratio of 72:1 to form a tape. The tape was then calendered between rolls at a calendering ratio of 3:1. The calendered tape was then transversely stretched at a ratio of 3.6:1 and dried at a temperature of 200° C.

The dried tape was then expanded at 330° C. in the machine direction to a uniaxial expansion ratio of 7:1. The resulting material was subsequently expanded in the transverse direction to an area expansion ratio of 12:1 at temperature of about 310° C.

This biaxially expanded membrane was compressed between rollers (at 25° C.) at a speed of 1 m/minute and with a compression force of 10 N/mm.

Comparative Example 2

A fine powder of polytetrafluoroethylene polymer made in accordance with the teachings of U.S. Pat. No. 6,541,589 to Baillie was combined with 0.151 lb/lb of lubricant (ISOPAR™ K, Exxon, Houston, Texas). The resultant mixture was then blended, compressed into a cylindrical pellet, and thermally conditioned for at least 8 hours at a temperature of 49° C. The cylindrical pellet was then extruded through a rectangular orifice die at a reduction ratio of 72:1 to form a tape. The tape was then calendered between rolls at a calendering ratio of 3:1. The calendered tape was then transversely stretched at a ratio of 3.6:1 and dried at a temperature of 200° C.

The dried tape was then expanded at 330° C. in the machine direction to a uniaxial expansion ratio of 5:1. The resulting material was subsequently expanded in the transverse direction to an area expansion ratio of 10.8:1 at temperature of about 310° C. The membrane was then sintered at a temperature of approximately 380° C. for 25 seconds.

This biaxially expanded membrane was compressed between rollers (at 25° C.) at a speed of 1 m/minute and with a compression force of 20 N/mm.

Comparative Example 3

A fine powder of polytetrafluoroethylene polymer made in accordance with the teachings of U.S. Pat. No. 6,541,589 to Baillie was combined with 0.145 lb/lb of lubricant (ISOPAR™ K, Exxon, Houston, Texas). The resultant mixture was then blended, compressed into a cylindrical pellet, and thermally conditioned for at least 8 hours at a temperature of 49° C. The cylindrical pellet was then extruded through a rectangular orifice die at a reduction ratio of 72:1 to form a tape. The tape was then calendered between rolls at a calendering ratio of 3:1. The calendered tape was then transversely stretched at a ratio of 3.6:1 and dried at a temperature of 230° C.

The dried tape was then expanded at 325° C. in the machine direction to a uniaxial expansion ratio of 5:1. The resulting material was subsequently expanded in the transverse direction to an area expansion ratio of 12.3:1 at temperature of about 300° C.

This biaxially expanded membrane was compressed between rollers (at 90° C.) at a speed of 5 m/minute and with a compression force of 80 N/mm.

Example 1

Part 1: Polytetrafluoroethylene (PTFE) Substrate Tape

A fine powder of polytetrafluoroethylene polymer made in accordance with the teachings of U.S. Pat. No. 4,576,869 to Malhotra, et al. was combined with 0.176 lb/lb of an isoparaffinic hydrocarbon lubricant (ISOPAR™ K, Exxon, Houston, Texas). The resultant mixture was then blended, compressed into a cylindrical pellet, and thermally conditioned for at least 8 hours at a temperature of 70° C. The cylindrical pellet was then extruded through a rectangular orifice die at a reduction ratio of 72:1 to form a tape. The tape was then calendered between rolls at a calendering ratio of 3:1. The calendered tape was then transversely stretched at a ratio of 3.6:1 and dried at a temperature of 240° C. This yielded a PTFE tape that was used as a substrate for subsequent coating with PARYLENE HT® and expansion.

Part 2: PPX Coating

The PTFE substrate was sent to Specialty Coating Systems (Indianapolis, IN). A sample of the tape was coated on both sides with a film of PARYLENE HT® to a thickness of approximately 1 micron using Specialty Coating System's commercially available default coating process, which will be referred to herein as a "Standard Process" and which forms a corresponding "Standard Coating". This sample was biaxially (i.e., in two directions) expanded in a biaxial pantograph machine at 335° C. to an area expansion ratio of 3.22. The expansion was performed in the machine and transverse directions simultaneously at a rate of 10%/sec in each of the two directions. This yielded a PPX filtration article. Properties of the PPX filtration article are set forth in Table 2.

Example 2

PTFE substrate tape (Example 1, Part 1) was sent to Specialty Coating Systems (Indianapolis, IN). A sample of the tape was coated on both sides with a film of PARYLENE HT® to a thickness of approximately 1 micron in accordance with the Standard Process (Example 1). This sample was biaxially (i.e., in two directions) expanded in a biaxial pantograph machine at 335° C. to an area expansion ratio of 12.1. The expansion was performed in the machine and transverse directions simultaneously at a rate of 10%/sec in each of the two directions. This yielded a PPX filtration article. Properties of the PPX filtration article are set forth in Table 2.

Example 3

PTFE substrate tape (Example 1, Part 1) was sent to Specialty Coating Systems (Indianapolis, IN). A sample of the tape was coated on both sides with a film of PARYLENE HT® to a thickness of approximately 5 microns in accordance with the Standard Process (Example 1). This sample was biaxially (i.e., in two directions) expanded in a biaxial pantograph machine at 335° C. to an area expansion ratio of 2.71. The expansion was performed in the machine and transverse directions simultaneously at a rate of 10%/sec in each of the two directions. The sample was subsequently put into an oven at a temperature of 380° C. for 30 seconds. This yielded a PPX filtration article. Properties of the PPX filtration article are set forth in Table 2.

Example 4

PTFE substrate tape (Example 1, Part 1) was sent to Specialty Coating Systems (Indianapolis, IN). A sample of the tape was coated on both sides with a film of PARYLENE HT® to a thickness of approximately 5 microns in accordance with the Standard Process (Example 1). This sample was biaxially (i.e., in two directions) expanded in a biaxial pantograph machine at 335° C. to an area expansion ratio of 11.3. The expansion was performed in the machine and transverse directions simultaneously at a rate of 10%/sec in each of the two directions. The sample was subsequently put into an oven at a temperature of 380° C. for 30 seconds. This yielded a PPX filtration article. Properties of the PPX filtration article are set forth in Table 2.

Example 5

PTFE substrate tape (Example 1, Part 1) was sent to Specialty Coating Systems (Indianapolis, IN). A sample of the tape was coated on both sides with a film of PARYLENE HT® to a thickness of approximately 2 microns in accordance with the Standard Process (Example 1). This sample was biaxially (i.e., in two directions) expanded in a biaxial pantograph machine at 300° C. to an area expansion ratio of 16.6. The expansion was performed in the machine and transverse directions simultaneously at a rate of 10%/sec in each of the two directions. The sample was subsequently put into an oven at a temperature of 380° C. for 30 seconds. This yielded a PPX filtration article. Properties of the PPX filtration article are set forth in Table 2.

Example 6

PTFE substrate tape (Example 1, Part 1) was sent to Specialty Coating Systems (Indianapolis, IN). A sample of the tape was coated on both sides with a film of PARYLENE HT® to a thickness of approximately 2 microns using a variation on the Standard Process, which will be referred to as "Process A" which forms a corresponding "Coating A". This sample was biaxially (i.e., in two directions) expanded in a biaxial pantograph machine at 335° C. to an area expansion ratio of 14.0. The expansion was performed in the machine and transverse directions simultaneously at a rate of 10%/sec in each of the two directions. The sample was subsequently put into an oven at a temperature of 380° C. for 30 seconds. This yielded a PPX filtration article. Properties of the PPX filtration article are set forth in Table 2.

Example 7

PTFE substrate tape (Example 1, Part 1) was sent to Specialty Coating Systems (Indianapolis, IN). A sample of the tape was coated on both sides with a film of PARYLENE HT® to a thickness of approximately 2 microns using a variation on the Standard Process, which will be referred to as "Process B" which forms a corresponding "Coating B". This sample was biaxially (i.e., in two directions) expanded in a biaxial pantograph machine at 335° C. to an area expansion ratio of 14.3. The expansion was performed in the machine and transverse directions simultaneously at a rate of 10%/sec in each of the two directions. The sample was subsequently put into an oven at a temperature of 380° C. for 30 seconds. This yielded a PPX filtration article. Properties of the PPX filtration article are set forth in Table 2.

Example 8

PTFE substrate tape (Example 1, Part 1) was sent to Specialty Coating Systems (Indianapolis, IN). A sample of the tape was coated on both sides with a film of PARYLENE HT® to a thickness of approximately 1 micron in accordance with Process B (Example 7). This sample was biaxially (i.e., in two directions) expanded in a biaxial pantograph machine at 300° C. to an area expansion ratio of 45.9. The expansion was performed in the machine and transverse directions simultaneously at a rate of 10%/sec in each of the two directions. The sample was subsequently put into an oven at a temperature of 380° C. for 30 seconds. This yielded a PPX filtration article. A layer of adhesive tape (ULINE S-1893, Pleasant Prairie, WI) was applied to the surface of the PPX filtration article and was quickly removed, thereby removing the PARYLENE HT® layer from that side of the PPX filtration article. Properties of the PPX filtration article are set forth in Table 2.

Example 9

PTFE substrate tape (Example 1, Part 1) was sent to Specialty Coating Systems (Indianapolis, IN). A sample of the tape was coated on both sides with a film of PARYLENE HT® to a thickness of approximately 1 micron in accordance with the Standard Process (Example 1). This sample was biaxially (i.e., in two directions) expanded in a biaxial pantograph machine at 320° C. to an area expansion ratio of 42.3. The expansion was performed in the machine and transverse directions simultaneously at a rate of 10%/sec in each of the two directions. The sample was subsequently put into an oven at a temperature of 380° C. for 30 seconds. This yielded a PPX filtration article. A layer of adhesive tape (ULINE S-1893, Pleasant Prairie, WI) was applied to the surface of the membrane and was quickly removed, thereby removing the PARYLENE HT© layer from that side of the PPX filtration article. Properties of the PPX filtration article are set forth in Table 2.

Example 10

PTFE substrate tape (Example 1, Part 1) was sent to Specialty Coating Systems (Indianapolis, IN). A sample of the tape was coated on both sides with a film of PARYLENE HT® to a thickness of approximately 2 microns in accordance with the Process B (Example 7). This sample was biaxially (i.e., in two directions) expanded in a biaxial pantograph machine at 320° C. to an area expansion ratio of 38.4. The expansion was performed in the machine and transverse directions simultaneously at a rate of 10%/sec in each of the two directions. The sample was subsequently put into an oven at a temperature of 380° C. for 30 seconds. This yielded a PPX filtration article. A layer of adhesive tape (ULINE S-1893, Pleasant Prairie, WI) was applied to the surface of the PPX membrane and was quickly removed, thereby removing the PARYLENE HT© layer from that side of the PPX filtration article. Properties of the PPX filtration article are set forth in Table 2.

Example 11

PTFE substrate tape (Example 1, Part 1) was sent to Specialty Coating Systems (Indianapolis, IN). A sample of the tape was coated on both sides with a film of PARYLENE HT® to a thickness of approximately 2 microns in accordance with the Standard Process (Example 1). This sample was biaxially (i.e., in two directions) expanded in a biaxial pantograph machine at 150° C. to an area expansion ratio of 7.04. The expansion was performed in the machine and transverse directions simultaneously at a rate of 10%/sec in each of the directions. This yielded a PPX filtration article. Properties of the PPX filtration article are set forth in Table 2.

Example 12

PTFE substrate tape (Example 1, Part 1) was sent to Specialty Coating Systems (Indianapolis, IN). A sample of the tape was coated on both sides with a film of PARYLENE HT® to a thickness of approximately 2 microns in accordance with the Standard Process (Example 1). This sample was biaxially (i.e., in two directions) expanded in a biaxial pantograph machine at 200° C. to an area expansion ratio of 15.6. The expansion was performed in the machine and transverse directions simultaneously at a rate of 25%/sec in each of the directions. This yielded a PPX filtration article. Properties of the PPX filtration article are set forth in Table 2.

TABLE 2

Properties of PPX Filtration Articles and Coating Processes

| Example | PPX Coating Thickness (μm) | Coating Process | Biaxial Expansion Temp. (° C.) | Expansion Rate (%/sec) | Sinter Temp. (° C.) for 30 sec. | Area Expansion Ratio | Mass per Area (g/m²) | Thickness (μm) |
|---|---|---|---|---|---|---|---|---|
| Comp. 1 | N/A | N/A | | | N/A | | 4.30 | 10.0 |
| Comp. 2 | N/A | N/A | | | 380 [a] | | 4.06 | 3.81 |
| Comp. 3 | N/A | N/A | | | N/A | | 4.06 | 2.79 |
| 1 | 1 | Standard | 335 | 10 | N/A | 3.22 | 55.7 | 70.6 |
| 2 | 1 | Standard | 335 | 10 | N/A | 12.1 | 14.9 | 20.5 |
| 3 | 5 | Standard | 335 | 10 | 380 | 2.71 | 70.9 | 82.1 |
| 4 | 5 | Standard | 335 | 10 | 380 | 11.3 | 17.1 | 23.2 |
| 5 | 2 | Standard | 300 | 10 | 380 | 16.6 | 11.0 | 46.6 |
| 6 | 2 | A | 335 | 10 | 380 | 14.0 | 13.1 | 55.0 |
| 7 | 2 | B | 335 | 10 | 380 | 14.3 | 12.8 | 37.3 |
| 8 | 1 | B | 300 | 10 | 380 | 45.9 | 3.90 | 22.6 |
| 9 | 1 | Standard | 320 | 10 | 380 | 42.3 | 4.24 | 13.6 |
| 10 | 2 | B | 320 | 10 | 380 | 38.4 | 4.76 | 12.8 |
| 11 | 2 | Standard | 150 | 10 | N/A | 7.04 | 26.0 | 107 |
| 12 | 2 | Standard | 200 | 25 | N/A | 15.6 | 11.8 | 84.6 |

N/A = not applicable
[a] = for 25 seconds

Each PPX filtration article was also evaluated for airflow (ATEQ and/or Gurley), mean filtrate permeability (See Equation (1) above), and bead retention (See Equation (2) above) using the testing procedures described above. The results are provided in Table 3 below.

TABLE 3

PPX Filtration Article Performance

| Example | Coating Process | ATEQ (L/hr @ 1.2 kPa) | Gurley (sec.) | Bead Retention (%) | Mean Filtrate Permeability (g/cm²/min/psi) | PVA_20 (cm³/m²) |
|---|---|---|---|---|---|---|
| Comp. 1 | N/A | 21.5 | | 3 | 0.43 | |
| Comp. 2 | N/A | 10.2 | | 13 | 0.18 | |
| Comp. 3 | N/A | | 126 | 34 | 0.02 | |
| 1 | Standard | 2.5 | | 37 | 0.07 | 1.47 |
| 2 | Standard | 10.2 | | 43 | 0.12 | 0.60 |
| 3 | Standard | 1.2 | | 68 | 0.01 | 1.05 |
| 4 | Standard | 6.3 | | 78 | 0.03 | 0.58 |
| 5 | Standard | 9.9 | | 92 | 0.06 | 0.37 |
| 6 | A | 23.5 | | 7. | 1.03 | 0.34 |
| 7 | B | 9 | | 97 | 0.06 | 0.49 |
| 8 | B | 25.1 | | 99 | 0.10 | 0.21 |
| 9 | Standard | 24.5 | | 81 | 0.19 | 0.16 |
| 10 | B | 15.8 | | 95 | 0.10 | 0.20 |
| 11 | Standard | 3.7 | | 97 | 0.005 | 1.73 |
| 12 | Standard | 5.6 | | 94 | 0.01 | 0.75 |

N/A = not applicable

Figure 9:
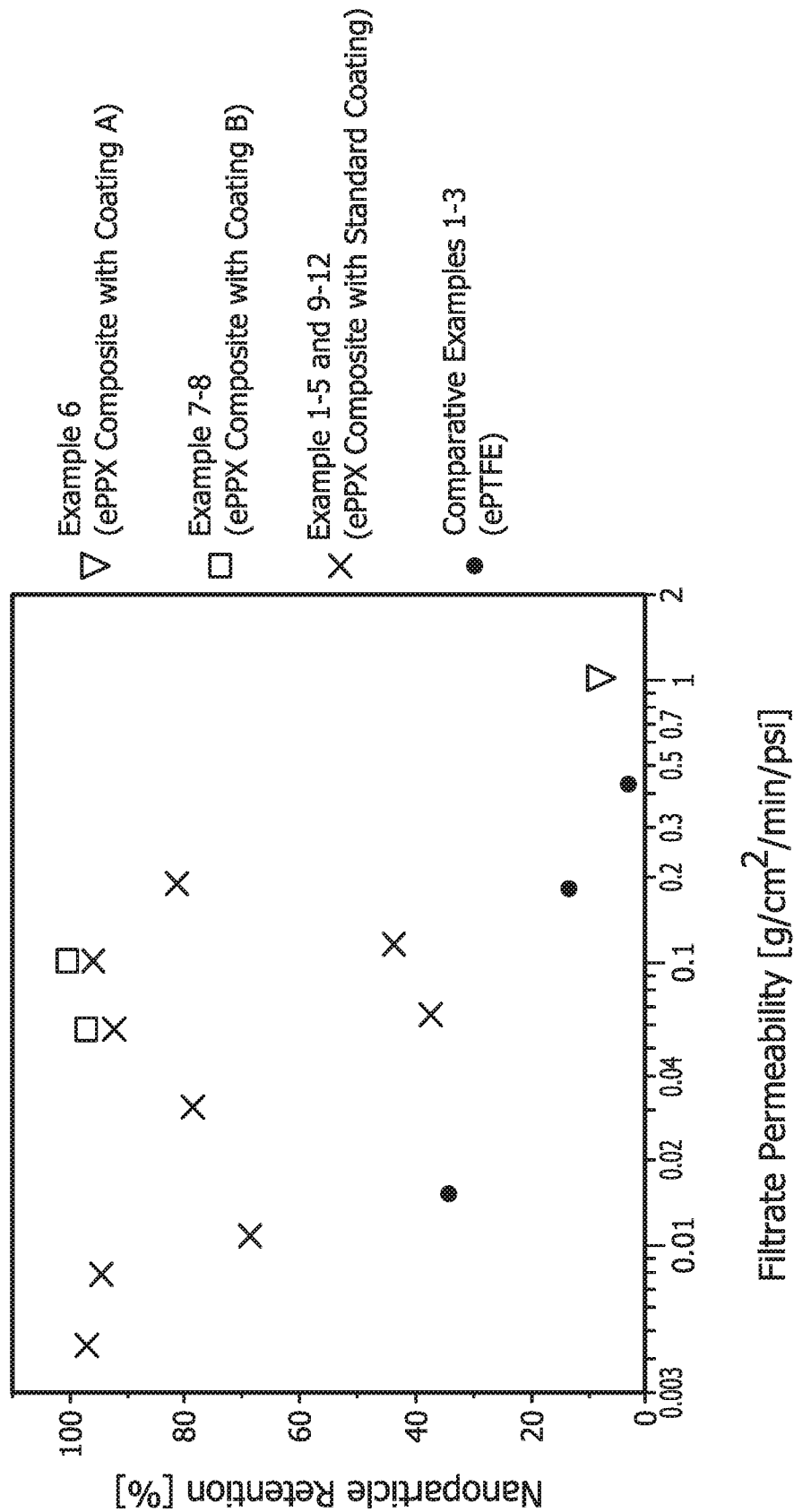
FIG. 9 is a graphical illustration of nanoparticle retention versus filtrate permeability for several coating processes in accordance with some embodiments.

The mean filtrate permeability was plotted versus the nanoparticle bead retention for the various PPX filtration articles and is provided as FIG. 9. In general, the PPX polymer membranes exhibited better permeability and retention of nanoparticles than the comparative ePTFE membranes. In addition, the PPX filtration articles having the Standard Coating (Examples 1-5 9, 11, and 12) and Coating B (Examples 7-8, 10) exhibited better retention than the PPX filtration article having Coating A (Example 6).

Figure 10:
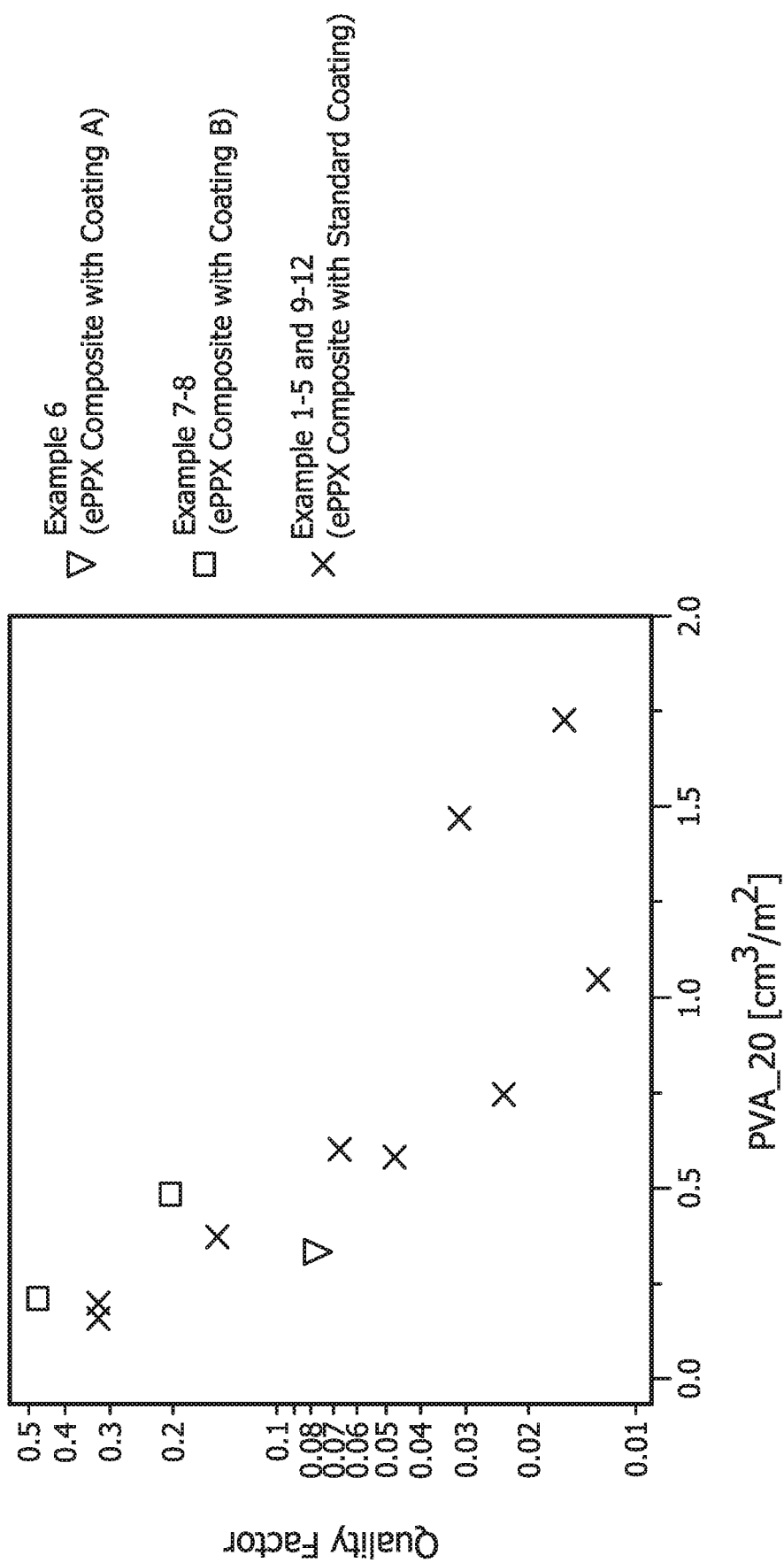
FIG. 10 is a graphical illustration of Quality Factor vs. PVA_20 (cm$^3$/m$^2$) for PPX filtration articles in accordance with some embodiments.
Figure 11:
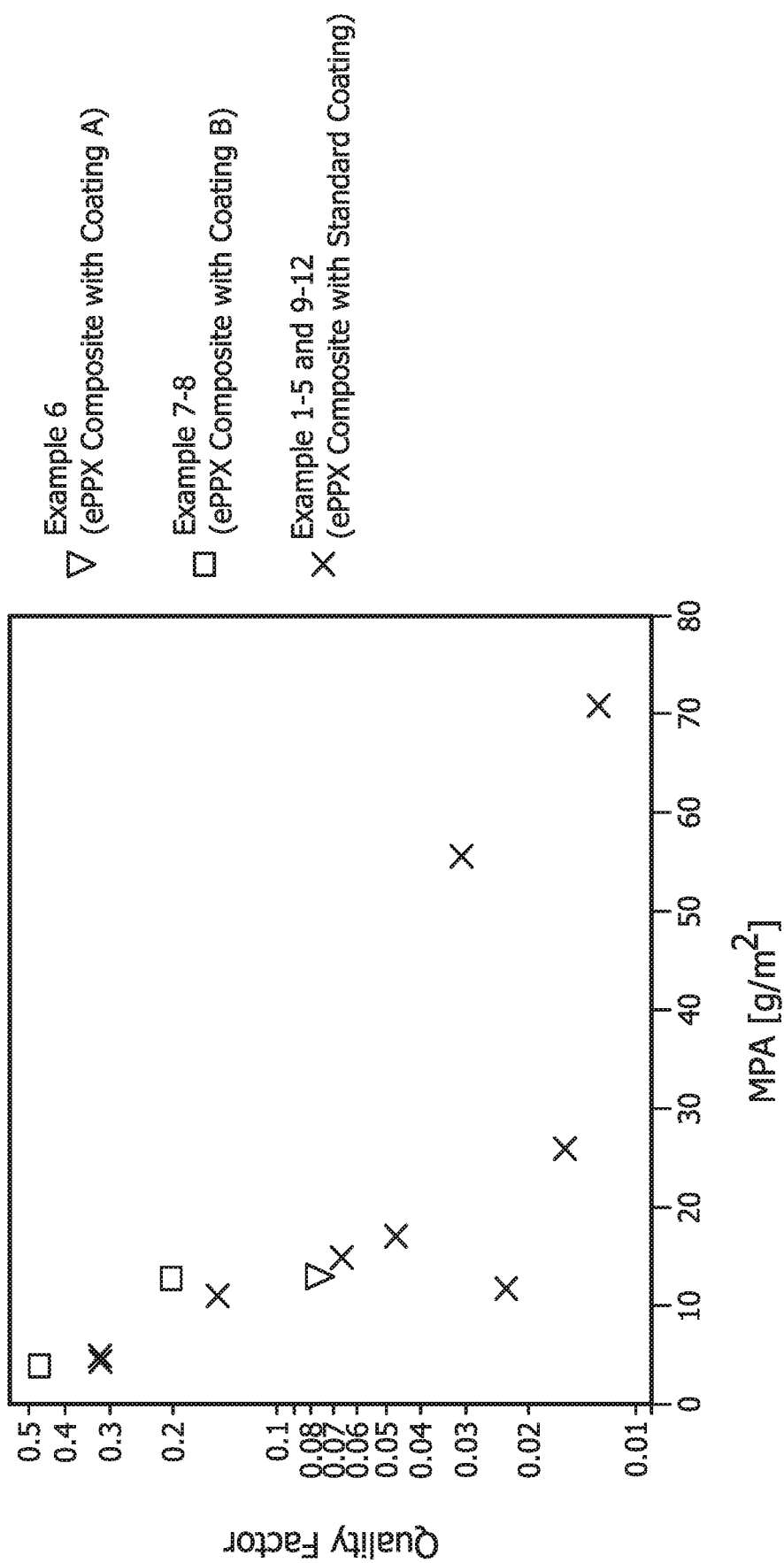
FIG. 11 is a graphical illustration of Quality Factor vs. mass/area (MPA) for PPX filtration articles in accordance with some embodiments.

FIGS. 10 and 11 depict the quality factor of the PPX filtration articles of Examples 1-12 as ranked by PVA_20 and mass/area (MPA), respectively. The quality factor of a PPX filtration article corresponds to the relative retention and permeability performance of the PPX filtration article. PVA_20 and mass/area (MPA) are properties that are both strongly correlated with the quality factor of a PPX filtration article. Generally, lower PVA_20 values correspond to a higher quality factor. The quality factor of the filtration article can be optimized by reducing mass/area (MPA) and/or PVA_20. The data indicate that in order to the maximize the trade off between flow and retention, it is desirable to minimize the PVA_20 value and/or the mass/area (MPA) value. As shown in FIG. 10, the quality factor can be optimized by reducing the PVA_20. In some embodiments, the PVA_20 is less than about 2.0 cm³/m², less than about 1.5 cm³/m², less than about 1.0 cm³/m², less than about 0.75 cm³/m², less than about 0.6 cm³/m², less than about 0.5 cm³/m², less than about 0.4 cm³/m², less than about 0.3 cm³/m², less than about 0.2 cm³/m², or less than about 0.1 cm³/m². In some embodiments, the PVA_20 is from about 0.1 cm³/m² to about 2.0 cm³/m², from about 0.1 cm³/m² to about 1.5 cm³/m², from about 0.1 cm³/m² to about 1.0 cm³/m², from about 0.1 cm³/m² to about 0.75 cm³/m², from about 0.1 cm³/m² to about 0.6 cm³/m², from about 0.1 cm³/m² to about 0.5 cm³/m², from about 0.1 cm³/m² to about 0.4 cm³/m², from about 0.1 cm³/m² to about 0.3 cm³/m², or from about 0.1 cm³/m² to about 0.2 cm³/m². FIG. 11 illustrates that the quality factor can be optimized by reducing the mass/area (MPA) of the PPX filtration article. In some embodiments, the mass/area (MPA) is less than 30 g/m². The mass/area (MPA) may range from about 5 g/m² to about 30 g/m², from about 5 g/m² to about 25 g/m², from about 5 g/m² to about 20 g/m², from about 5 g/m² to about 15 g/m², or from about 5 g/m² to about 10 g/m².

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A filtration device comprising:
   at least one polyparaxylylene filtration article including:
   a porous substrate; and
   at least one polyparaxylylene polymer membrane coupled to at least one side of the porous substrate,
   wherein the at least one polyparaxylylene polymer membrane has a pore size from about 1 nm to about 100 nm, and
   wherein the filtration article has a volume of pores less than 20 nm per unit membrane area ("PVA 20") less than about 0.6 cm³/m² and a mass/area (MPA) less than about 30 g/m², wherein the polyparaxylylene polymer membrane comprises a polyparaxylylene polymer film that has been expanded in one or more directions, and wherein the polyparaxylylene polymer film is an unexpanded polyparaxylylene polymer, and wherein the polyparaxylylene polymer comprises

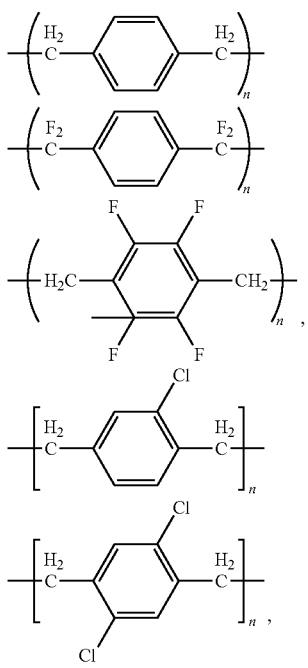

or a combination thereof.

2. The filtration device of claim 1, wherein the at least one polyparaxylylene polymer membrane has a thickness from about 0.05 microns to about 3 microns.

3. The filtration device of claim 1, wherein the at least one polyparaxylylene polymer membrane has a permeability of at least about 0.003 g/cm²/min/psi.

4. The filtration device of claim 1, wherein the at least one polyparaxylylene polymer membrane has a pore size from about 5 nm to about 50 nm.

5. The filtration device of claim 1, wherein the polyparaxylylene filtration article has a PVA 20 from about 0.1 cm³/m² to about 2.0 cm³/m².

6. The filtration device of claim 1, wherein the polyparaxylylene filtration article has a mass/area from about 5 g/m² to about 30 g/m².

7. The filtration device of claim 1, wherein the polyparaxylylene filtration article has a PVA 20 from about 0.1 cm³/m² to about 2.0 cm³/m² and a mass/area from about 5 g/m² to about 30 g/m².

8. The filtration device of claim 1, wherein the polyparaxylylene polymer membrane is a PPX-AF4 membrane.

9. The filtration device of claim 1, further comprising a second polyparaxylylene polymer membrane coupled to an opposing side of the porous substrate.

10. The filtration device of claim 1, wherein the at least one polyparaxylylene filtration article is positioned within a filtration housing comprising: a fluid inlet configured to direct a feed fluid containing a population of particles into the filtration housing; and
   a fluid outlet configured to direct a filtrate from the filtration housing,
   wherein the at least one polyparaxylylene polymer membrane is disposed within the filtration housing between the fluid inlet and the fluid outlet and is configured to separate at least a portion of the population of particles from the feed fluid.

11. The filtration device of claim 10, wherein the at least one polyparaxylylene polymer membrane comprises:
   a first polyparaxylylene polymer membrane coupled to a first side of the porous substrate, wherein the first polyparaxylylene polymer membrane is in fluid communication with the fluid inlet; and
   a second polyparaxylylene polymer membrane coupled to a second side of the porous substrate, wherein the second polyparaxylylene polymer membrane is in fluid communication with the fluid outlet.

* * * * *